(12) United States Patent
Kassai et al.

(10) Patent No.: US 7,204,550 B2
(45) Date of Patent: Apr. 17, 2007

(54) SEAT OF CHILDCARE APPARATUS

(75) Inventors: Kenzou Kassai, Osaka (JP); Sachiyo Suzuki, Tokyo (JP)

(73) Assignee: Aprica Ikujikenkyukai Aprica Kassai Kabushikikaisha, Osaka-shi (JP)

( * ) Notice: Subject to any disclaimer, the term of this patent is extended or adjusted under 35 U.S.C. 154(b) by 0 days.

(21) Appl. No.: 11/388,782

(22) Filed: Mar. 23, 2006

(65) Prior Publication Data
US 2006/0220436 A1  Oct. 5, 2006

(30) Foreign Application Priority Data
Apr. 1, 2005  (JP) ............... 2005-106225

(51) Int. Cl.
*A47C 31/00* (2006.01)
(52) U.S. Cl. ............... 297/180.11; 297/180.14; 297/452.43; 297/452.46
(58) Field of Classification Search ........... 297/180.11, 297/180.14, 180.13, 219.12, 452.42, 180.16, 297/452.43, 452.46, 452.47, 452.45, 250.1; 5/938
See application file for complete search history.

(56) References Cited

U.S. PATENT DOCUMENTS

| | | | | |
|---|---|---|---|---|
| 4,136,412 A | * | 1/1979 | Wilhelm | .................. 5/417 |
| 4,773,702 A | | 9/1988 | Takahashi et al. | |
| 5,375,552 A | * | 12/1994 | Scott | .................. 114/363 |
| 5,403,065 A | * | 4/1995 | Callerio | .................. 297/180.11 |
| 5,626,387 A | * | 5/1997 | Yeh | .................. 297/180.14 |
| 5,645,314 A | * | 7/1997 | Liou | .................. 297/180.14 |
| 6,106,057 A | | 8/2000 | Lee | |
| 6,786,541 B2 | * | 9/2004 | Haupt et al. | .................. 297/180.1 |
| 6,877,815 B2 | | 4/2005 | Kassai et al. | |
| 2005/0173950 A1 | | 8/2005 | Bajic et al. | |

FOREIGN PATENT DOCUMENTS

| | | | |
|---|---|---|---|
| EP | 0514003 | * | 11/1992 |
| EP | 1 424 259 | | 6/2004 |
| GB | 2076648 | * | 12/1981 |
| JP | 2004-229910 | | 8/2004 |

* cited by examiner

*Primary Examiner*—Milton Nelson, Jr.
(74) *Attorney, Agent, or Firm*—W. F. Fasse; W. G. Fasse

(57) ABSTRACT

A seat of a childcare apparatus comprises a backrest board having through holes in a thickness direction, a stacked board which has through holes which can be aligned with the through holes, a reflective sheet provided so as to cover the through holes and forming an air layer between the reflective sheet and the backrest board, and a ventilation hole provided in the reflective sheet.

8 Claims, 3 Drawing Sheets

SEAT OF CHILDCARE APPARATUS

BACKGROUND OF THE INVENTION

1. Field of the Invention

The present invention relates to a seat of a childcare apparatus such as a baby carriage, a child safety seat, a baby chair, a nursing band and the like.

2. Description of the Background Art

A conventional seat of a childcare apparatus is disclosed in Japanese Unexamined Patent Publication No. 2004-229910, for example.

According to the above document, a seat of a childcare apparatus comprises a seat board, a backrest board which can be reclined, a stacked board integrally having a seat surface part and a back surface part opposed to the seat board and the backrest board, respectively. Each of the seat board and the backrest board and the stacked board has through holes and the through holes of them can be relatively positioned so as to be aligned or shut down. Ventilation of the seat of the childcare apparatus can be ensured by relatively adjusting the positions of the through holes.

According to the conventional seat of the childcare apparatus constituted as described above, ventilation of the seat has been considered. Meanwhile, there is a case where reflected heat of the sun from a road surface is intense in summer and the like. In this case, in order to prevent the reflected heat from the road surface, it is considered to provide a reflective sheet on the back surface of the stacked board. However, only with the reflective sheet provided on the back surface of the stacked board, the reflected heat from the road surface could enter the seat of the childcare apparatus through the through holes provided in the seat board and the stacked board, and the seat could become very uncomfortable space to be seated for a baby.

SUMMARY OF THE INVENTION

The present invention was made in view of the above problem and it is an object of the present invention to provide a seat of a childcare apparatus in which comfortable seat circumstances can be provided for a baby.

A seat of a childcare apparatus according to the present invention comprises a board forming a seat having a first hole in a thickness direction, a cover board provided so as to cover the first hole and forming an air layer between the board forming the seat and the cover board, and ventilating means for ventilating the air layer.

Since the through holes are provided in the board which forms the seat and the air heat insulating layer is formed between the board and the cover board to cover the through holes, the board is not affected by heat from the outside. In addition, since the ventilating means is provided in the air layer, heat from the board forming the seat is discharged to the outside.

As a result, there can be provided a seat of a childcare apparatus which can provide comfortable seat circumstances for a baby.

Preferably, the seat according to the present invention further comprises a stacked board provided so as to be stacked on the board forming the seat and having a second hole in a thickness direction and moving means for relatively moving the second hole of the stacked board between a first position in which the second hole is aligned with the first hole of the board and a second position in which the second hole is shifted from the first hole.

More preferably, the cover board is provided on the stacked board.

In addition, the ventilating means may be a fan or a ventilation hole.

Furthermore, the cover board may have a rising part from the board forming the seat or the cover board, and the ventilation hole may be provided in the rising part.

More preferably, the cover board may have a reflective surface.

In addition, the board forming the seat may be a seat board or a backrest board.

DESCRIPTION OF THE PREFERRED EMBODIMENTS

Figure 1:
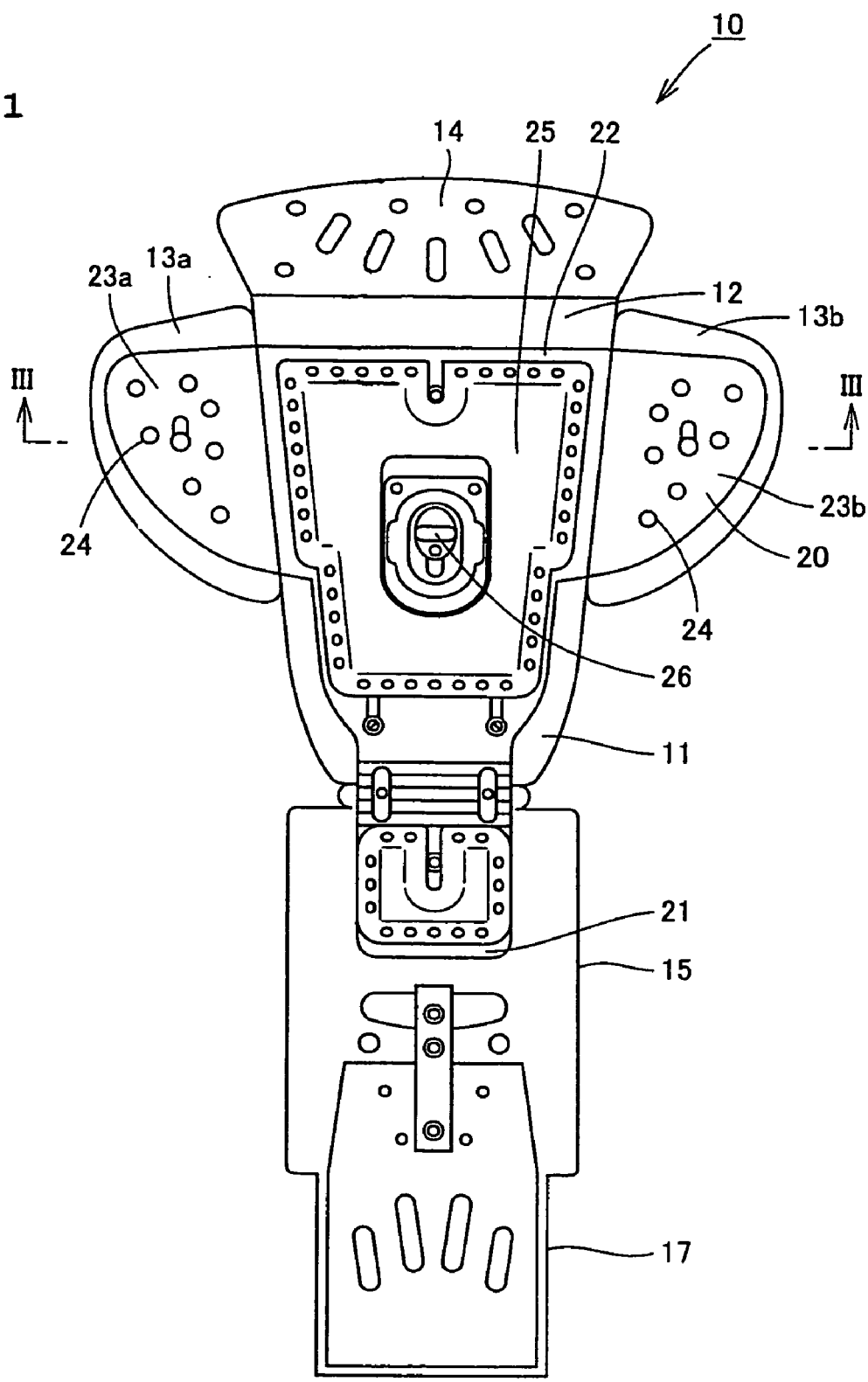
FIG. 1 is a developed view showing a back surface of a seat of a childcare apparatus according to one embodiment of the present invention, in which positions of through holes of a seat board and through holes of a stacked board coincide with each other.
Figure 2:
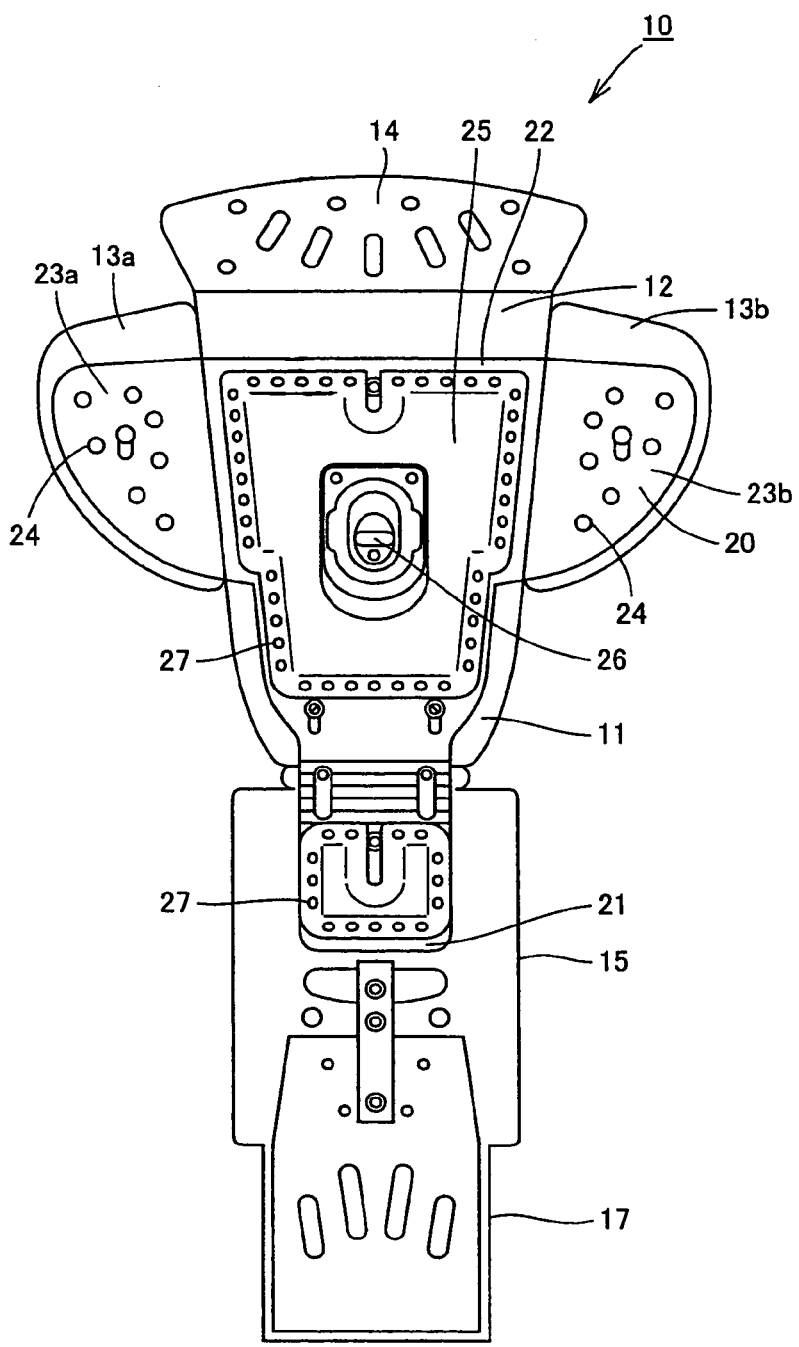
FIG. 2 is a developed view showing the back surface of the seat of the childcare apparatus according to one embodiment of the present invention, in which the positions of the through holes of the seat board and the through holes of the stacked board are shifted from each other.
Figure 3:
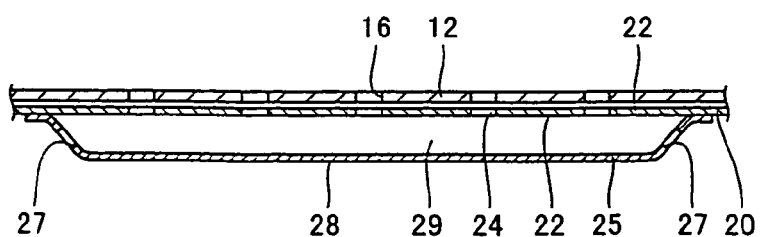
FIG. 3 is a sectional view showing a part taken along line III—III in FIG. 1.

An embodiment of the present invention will be described with reference to the drawings hereinafter. FIGS. 1 and 2 are views showing a seat 10 of a childcare apparatus according to one embodiment of the present invention. Specifically, FIG. 1 is a view showing a state in which through holes of a seat board 11 which forms the seat and through holes of a stacked board 20 provided on a back surface of the above board (on a front side in FIGS. 1 and 2) are aligned, and FIG. 2 is a view showing a state in which the through holes of the seat board 11 and the through holes of the stacked board 20 provided on the back surface of the above board are shifted. FIG. 3 is a sectional view showing a part taken along line III—III in FIG. 1.

Referring to FIGS. 1 to 3, the seat 10 of the childcare apparatus is a core member which is mounted on a body of a baby carriage and the like and forms the seat and comprises the seat board 11 and the stacked board 20. The seat board 11 integrally comprises a backrest board 12 for holding the back of a baby when the baby is held by the seat 10 of the child care apparatus, a pair of side boards 13a and 13b extending sideways from both side edges of the backrest board, a head board 14 extending upward from an upper edge of the backrest board 12, for holding the head of the baby, a seating board 15 for holding the buttocks of the baby, and a foot board 17 provided at a rear end of the seating board 15.

The seat 10 of the childcare apparatus may be used as a core member of a cloth seat hammock mounted on a body of a baby carriage or may be directly mounted on the body thereof without the seat hammock.

FIG. 1 shows a state in which the back surface of the seat 10 of the childcare apparatus is horizontally developed. When the seat 10 of the childcare apparatus is mounted on the baby carriage and used in the form of a chair, the backrest board 12 rises upward from the upper edge of the seating board 15. Alternatively, when it is used in the form of a bed, the pair of side boards 13a and 13b rises upward from both side edges of the backrest board 12, and the head board 14 rises upward from the upper edge of the backrest board 12.

As shown in FIGS. 1 and 2, the stacked board 20 is mounted on the back surface of the seat board 11. The stacked board 20 integrally comprises a seat surface part 21 opposed to the seating board 15, a back surface part 22 opposed to the backrest board 12, and a pair of side surface parts 23a and 23b opposed to the pair of side boards 13a and 13b.

To ensure proper ventilation, through holes 24 are formed in each part of the stacked board 20, that is, in the seat surface part 21, the back surface part 22 and the side surface parts 23a and 23b. It is to be noted that through holes 16 (refer to FIG. 3) which can be aligned with the through holes 24 of the stacked board 20 are formed in each of the seating board 15, the backrest board 12 and the side boards 13a and 13b of the seat board 11 although they are not seen because they are overlapped with the stacked board 20 or a cover board 25 which will be described below, or are hindered by them.

The stacked board 20 can be changed in its position between a first position in which the through holes 24 of the stacked board 20 and the through holes 16 of the seat board 11 are aligned (shown in FIG. 3) and a second position in which those through holes 16 and 24 are shifted and closed up. According to the illustrated embodiment, the stacked board 20 can be changed in position between the above first and second positions when a lever 26 which is moving means provided in the center of the backrest board 12 is slid by a predetermined distance in the vertical direction.

Since a specific constitution to slide the stacked board 20 is well known, its description will be omitted here.

When ventilation is needed for the seat of the baby carriage and the like, or when ventilation is not needed for it, the stacked board 20 is moved with the use of the lever 26. Accordingly, the cover board 25 is also moved.

The cover board 25 (refer to FIG. 3) is provided on the back surface part 22 of the stacked board 20, and a bag-shaped air layer 29 is formed between them. A plurality of ventilation holes 22 are provided around a rising part of the cover board 25 from the stacked board 20 as ventilating means. Although only the back surface part 22 is shown in FIG. 3, the same is applied to the seat surface part 21.

Thus, since the air layer 29 is formed on the back surfaces of the seat surface part 21 and the back surface part 22 of the stacked board 20 by the cover board 25, a heat insulation effect can be provided. As a result, a seat condition can be maintained such that it is cooler in summer and it is warmer in winter.

Next, a description will be made of the cover board 25. As shown in FIG. 3, the air layer 29 is formed between the cover board 25 and the back surface part 22, and the ventilation holes 27 are provided around the rising part from the stacked board 20. The cover board 25 may be a reflective sheet 28 which reflects outside light or heat. In addition, the whole cover board 25 may not be necessarily the reflective sheet and the cover board 25 may be constituted with the use of a member having a reflective surface only on a surface opposed to the air layer 29.

Thus, since the air layer 29 is provided with the use of the cover board 25 and the cover board comprises the reflective sheet, heat from a baby held at a position of the seat 10 can be let out through the ventilation holes 27 by adjusting the through holes 16 and 24. In addition, reflected heat of the sun from a road surface can be reflected by the reflective sheet 28, and outside heat due to reflected heat of the sun cannot reach the backrest board 12 or the seating board 15 through the through holes 16 and 24 directly in summer. As a result, comfortable seat circumstances can be provided for the baby positioned on the seat 10.

Figure 4:
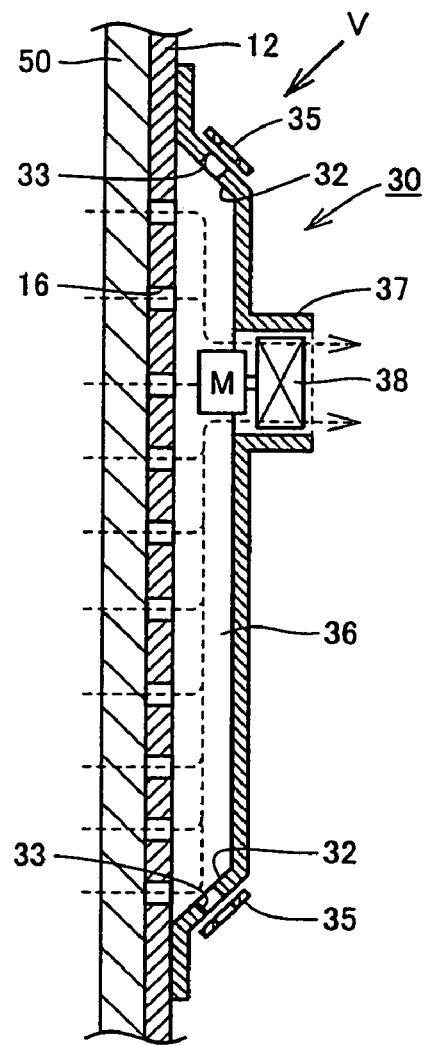
FIG. 4 is a view according to another embodiment of the present invention, which corresponds to FIG. 3.

Next, a description will be made of another embodiment of the present invention. FIG. 4 shows the structure of another embodiment of the present invention, which corresponds to the above embodiment in FIG. 3. According to this embodiment, although the seat board 11 in the above embodiment is provided, the stacked board stacked thereon is not provided. Meanwhile, a cover board 30 similar to the cover board 25 provided on the back surface part 22 of the stacked board 20 is provided on a back surface of a backrest board 12. Therefore, according to this embodiment, through holes 16 in the backrest board 12 are open. Here, a seat 50 of a baby carriage is also shown in FIG. 4.

Referring to FIG. 4, this embodiment is different from the above embodiment in that a rising part 32 of the cover board 30 rises from the backrest board 12. A plurality of ventilation holes 33 are provided in the rising part 32.

An opening 37 is provided at a part of the cover board 30 and an electric fan 38 is provided in the opening 37 as ventilating means. In addition, the cover board 30 may be a reflective sheet which reflects light or heat from the outside like in the above embodiment.

Figure 5:
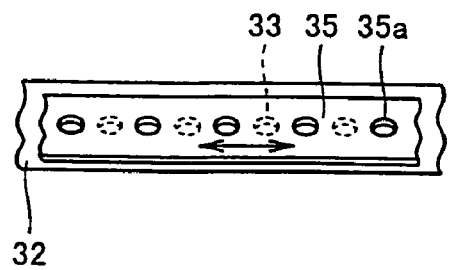
FIG. 5 is a view taken in a direction of an arrow V in FIG. 4.

A shutter 35 is provided to open or close the plurality of ventilation holes 33 provided in the rising part 32. FIG. 5 shows a mounted state of the shutter 35 at the rising part 32.

FIG. 5 is a view taken in a direction shown by an arrow V in FIG. 4. Referring to FIG. 5, the shutter 35 has through holes 35a having the same pitch as that of the ventilation holes 33 provided in the rising part 32, and the ventilation holes 33 are opened or closed by movement of the shutter 35.

Thus, according to this embodiment, since a heat insulating air layer 36 is formed on the back surfaces of the backrest board 12 and a seating board 15, the seat 50 is not directly affected by heat of the back surface. In addition, since air from the through holes 16 of the seat board 11 can be let out by the electric fan 38, the baby on the seat 50 can feel a comfortable wind.

It is to be noted that since the plurality of ventilation holes 33 are provided in the rising part 32 of the cover board 30 and ventilation is performed through these ventilation holes 33, the electric fan 38 is not necessarily operated all the time.

Furthermore, since the shutter 35 is provided for the ventilation holes 33, the baby can be put in comfortable circumstances by adjusting an opening or closing amount of the shutter 35 and ON/OFF of the electric fan 38 according to a condition of the baby.

Furthermore, although the description has been made of the case where both electric fan and ventilation holes are provided in the above embodiment, the present invention is not limited to this, and only either one of them may be provided.

Still furthermore, although the description has been made of the case where the seat of the childcare apparatus is used in the baby carriage in the above embodiment, it is needless to say that the present invention is not limited to this, and can be applied to a seat of another childcare apparatus such as a child safety seat, a baby chair, a nursing band or the like.

Still furthermore, although the shutter shown in FIG. 4 is not provided for the ventilation holes 27 of the cover board 25 in the embodiment shown in FIG. 3, a shutter like that shown in FIG. 4 may be provided for them.

Still furthermore, although a stacked board is not provided on the backrest board 12 in the embodiment shown in FIG. 4, a stacked board like that shown in FIG. 3 may be provided thereon.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

Since the seat of the childcare apparatus according to the present invention can provide comfortable circumstances for a baby, it can be advantageously applied to a seat of a childcare apparatus such as a baby carriage or a child safety seat.

What is claimed is:

1. A seat of a childcare apparatus comprising:
    a first board forming a seat and having a first hole in a thickness direction;
    a cover board provided so as to cover said first hole and forming an air layer between said first board forming the seat and the cover board;
    ventilating means for ventilating said air layer;
    a stacked board provided so as to be stacked on said first board forming the seat and having a second hole in a thickness direction; and
    moving means for relatively moving said second hole of the stacked board between a first position in which the second hole is aligned with said first hole of the first board and a second position in which the second hole is shifted from said first hole.

2. The seat of the childcare apparatus according to claim 1, wherein said first board forming the seat is a backrest board.

3. The seat of the childcare apparatus according to claim 1, wherein said cover board is provided on said stacked board.

4. The seat of the childcare apparatus according to claim 1, wherein said ventilating means is a fan.

5. The seat of the childcare apparatus according to claim 1, wherein said ventilating means comprises a ventilation hole.

6. The seat of the childcare apparatus according to claim 1, wherein said cover board has a rising part that rises from said first board forming the seat or said cover board and said ventilating means is provided in said rising part.

7. The seat of the childcare apparatus according to claim 1, wherein said cover board has a reflective surface.

8. The seat of the childcare apparatus according to claim 1, wherein said first board forming the seat is a seat board.

* * * * *